United States Patent [19]

Chapin

[11] Patent Number: 4,749,411

[45] Date of Patent: Jun. 7, 1988

[54] DISINFECTING AND HIGH-SPEED BUFFING COMPOSITION COMPRISING POLYETHYLENE GLYCOL AND QUATERNARY AMMONIUM GERMICIDE, AND METHOD OF USE

[75] Inventor: Jay C. Chapin, Salem, Mass.

[73] Assignee: M. D. Stetson Company, Randolph, Mass.

[21] Appl. No.: 839,786

[22] Filed: Mar. 14, 1986

[51] Int. Cl.$^4$ ............................ C09G 1/08; B05D 3/12
[52] U.S. Cl. .......................................... 106/10; 106/3; 106/18.29; 106/18.32; 422/28; 427/355; 427/368
[58] Field of Search ........... 252/106, 547, 153, 174.21, 252/8.75, 8.8, DIG. 14, DIG. 2; 106/3, 18.32, 10, 18.29; 422/28; 427/355, 368

[56] References Cited

U.S. PATENT DOCUMENTS

| | | | |
|---|---|---|---|
| 2,702,277 | 2/1955 | Kinney | 252/106 |
| 3,352,787 | 11/1967 | Bodach | 252/108 |
| 3,645,946 | 2/1972 | Lyman | 524/567 |
| 3,822,312 | 7/1974 | Sato et al. | 252/527 |
| 4,069,066 | 1/1978 | Hindle et al. | 134/6 |
| 4,369,134 | 1/1983 | Deguchi et al. | 252/526 |
| 4,537,802 | 8/1985 | Flanagan | 427/368 |
| 4,601,954 | 7/1986 | Coleman | 428/522 |
| 4,647,314 | 3/1987 | Mullins et al. | 134/30 |

OTHER PUBLICATIONS

Akisada, H., "The Effect Species of Counterion on the Interaction Between Cationic Surfactant and Polyethylene Glycol," Mem. Fac. Sci., Kyushu Univ., Ser. C, 11(2), 243–249.

*Primary Examiner*—Prince E. Willis
*Attorney, Agent, or Firm*—Wolf, Greenfield and Sacks

[57] ABSTRACT

A composition for simultaneously disinfecting a surface and depositing a film thereon that can be high-speed buffed to produce a high-gloss, slip-resistant surface. The composition is a solution wherein the solvent portion is water and the solute portions consist of a solid, waxy polyethylene glycol compound and a germicidally-effective quaternary ammonium chloride compound.

24 Claims, No Drawings

DISINFECTING AND HIGH-SPEED BUFFING COMPOSITION COMPRISING POLYETHYLENE GLYCOL AND QUATERNARY AMMONIUM GERMICIDE, AND METHOD OF USE

BACKGROUND OF THE INVENTION

This invention relates to a combination disinfecting and buffing composition, and more particularly to a composition which can be applied to a floor or other hard surface in a single operation to both disinfect and deposit a coating that will be slip resistant and have a high gloss when high-speed buffed.

In the past ten years a major change has occurred in the procedure by which floor finishes are maintained. This change has been brought about by the development of high-speed buffing machines which operate at speeds of 300 to 3000 RPM. With these machines and an appropriate buffing aid, it is possible for a custodian to restore the gloss of a floor finish to a reflectance as good as, or better than, the initial gloss of the finish.

Typically, a building custodian or cleaning contractor puts down three to four successive coats of an acrylic finish as a base and then from time to time will high-speed buff the floor finish to repair and restore the finish to a high gloss by removing scuffs and other marks. This operation may be repeated over many months and allows the finish to be kept in a high state of attractive appearance.

Another maintenance operation that is frequently performed in hospitals and other health-care facilities is the disinfecting of floors prior to high-speed buffing. This is done to kill microbial organisms that may be present on the floor surface and which would be air dispersed throughout the facility by the high-speed buffing procedure. Thus, where both disinfecting and buffing is to be achieved, typically two operations are required—the floor is first disinfected and then a buffing aid is applied and the floor is buffed.

The disinfectant of choice is usually a quaternary ammonium chloride compound. However, these materials are cationic or inverse soaps that are inactivated by the typical anionic buffing aids and floor cleaning soaps. Thus, what often happens when quaternary disinfectants are used on floors is that they are partially or wholly inactivated by the residue of buffing aid or soap film deposited by prior maintenance.

It has been suggested to combine a nonionic surfactant with a quaternary ammonium chloride compound to produce a germicidal, detergent composition for cleaning hard surfaces. See U.S. Pat. Nos. 3,965,026 to Lancz, 4,272,395 to Wright, 4,443,363 to Klinger et al., and 4,540,505 to Frazier. It has also been suggested to apply a wax-free, aqueous composition for cleaning, buffing, and burnishing plastic and plastic-coated floor surfaces including as a lubricant a water-soluble, low-volatility, linear polymer of ethylene and/or propylene oxide having a viscosity in Saybolt Universal Seconds (S.U.S.) at 100° F. of from 50 to 90,000 (e.g., UCON fluids sold by Union Carbide Company), a glycol ether as a cooperating solvent, plasticizer, cleaner, coupling and stabilizing agent, and a surfactant, preferably nonionic but which may be a quaternary ammonium salt (cationic), as a wetting agent and cleaner. See U.S. Pat. No. 4,537,802 to Flanagan. This composition, when applied to the floor and subjected to high-speed buffing, is said to permeate into the floor finish to establish a fusion or relamination of the surface coating or film.

It is an object of the present invention to provide a disinfecting and buffing composition which can be applied in one operation.

It is a further object of this invention to provide a composition for disinfecting and for assisting in high-speed buffing to obtain a high-gloss, slip-resistant, solid coating on a surface.

SUMMARY OF THE INVENTION

The composition of this invention is a solution, the solute portions of which consist of a solid, waxy polyethylene glycol compound and a germicidally-effective quaternary ammonium chloride compound, and the solvent portion of which is water. The quaternary ammonium chloride compound is present in an amount sufficient to disinfect the surface and to plasticize the polyethylene glycol compound so that, when high-speed buffed, a high-gloss coating results which has a safe static coefficient of friction (slip resistance). The polyethylene glycol compound has a high average molecular weight of at least about 1450 in order to produce a hard surface coating, and preferably has an average molecular weight of at least about 8000 to about 20,000. The incorporation of the quaternary ammonium chloride compound with the polyethylene glycol compound increases the static coefficient of friction (slip resistance) surface coating by at least about 5 percent, and preferably at least about 10 percent, over that of the polyethylene glycol compound alone.

The invention also includes a process for disinfecting and forming a high-gloss, slip-resistant solid coating on a surface by high-speed buffing which can be achieved in a single application rather than separate applications of a disinfecting composition and a buffing composition. The process consists of depositing on the surface a layer of a solution of the aforementioned polyethylene glycol compound and germicidally-effective quaternary ammonium chloride compound, permitting the water to evaporate therefrom, and high-speed buffing to form a high-gloss, slip-resistant solid coating on the surface.

DETAILED DESCRIPTION OF A PREFERRED EMBODIMENT

This invention relates to a composition for disinfecting and for promoting high-speed buffing. The composition is applied to a floor or other hard surface as a solution wherein the solvent portion consists of water and the solute portions consist of a solid-phase, waxy polyethylene glycol compound and a germicidally-effective quaternary ammonium chloride compound. The polyethylene glycol compound has a high molecular weight and forms a hard surface finish. The quaternary ammonium chloride compound, in addition to disinfecting the surface, substantially increases the static coefficient to friction (slip resistance) of the composition after high-speed buffing.

The polyethylene glycol compounds useful in this invention include any of several condensation polymers of ethylene glycol having the generalized formula:

$$HOCH_2(CH_2OCH_2)_nCH_2OH$$

where n represents the average number of oxyethylene groups. The polyethylene glycol (PEG) compounds are water soluble, waxy solids having a high molecular weight which form a very hard surface finish after high-speed buffing. Preferably, the polyethylene glycol compound has a number average molecular weight of at least about 1450 ($n=31$) and more preferably at least about 8000 ($n=180$) to about 20,000 ($n=452$). Suitable polyethylene glycol compounds are available from Union Carbide Corporation under the tradename "Carbowax" and from Dow Chemical Co. under the tradename "Dow PEG Compound Polyglycol."

The quaternary ammonium chloride compounds useful in this invention are water soluble and germicidally effective. Compounds which satisfy these requirements include alkyl dimethyl benzyl and alkyl dimethyl ethyl benzyl ammonium compounds wherein the alkyl group contains about 12 to 18 carbon atoms, dialkyl dimethyl ammonium compounds wherein the alkyl groups each contain 8 to 10 carbon atoms, and mixtures thereof. It is preferred to employ a class of these germicides which possesses a phenol coefficient of at least 200 at 20° C. against *Staphylococcus aureus* and *Salmonella typhosa*. It is most preferable that those compounds are used which have an exceptionally high phenol coefficient—namely, quaternary ammonium chloride compounds possessing one long alkyl radical containing from 12 to 18 carbon atoms but, preferably, either with only $C_{12}$ to $C_{16}$ groups, or with only a minimum of $C_{18}$ groups present, and one benzene nucleus.

Suitable quaternary ammonium chloride germicides are commercially available. Illustrative are: a mixture of 50% n-alkyl ($C_{14}$-$C_{18}$) dimethyl benzyl ammonium chloride and 50% n-alkyl ($C_{12}$-$C_{18}$) dimethyl ethyl benzyl ammonium chloride (BTC 2125, from Onyx Chemical Co.); and a mixture of 20 to 25% dioctyl dimethyl ammonium chloride, 25% didecyl dimethyl ammonium chloride, and 50% octyl decyl ammonium chloride (Bardac 20, from Lonza, Inc.).

In addition to disinfecting the surface, the quaternary ammonium chloride compound plasticizes the polyethylene glycol compound so as to increase the slip resistance of the floor finish. In the absence of the quaternary ammonium chloride compound, the high molecular weight, hard waxy polyethylene glycol compounds used in this invention would produce a coating on the floor finish that would have a slip resistance below the accepted industry standard for a safe walkway.

The "James Machine" is commonly used in the floor care industry to evaluate quantitatively the static coefficient of friction (SCF) of floor finishes (ASTM D2047-75). With this machine, the angle at which a strut attached to a stationary shoe begins to slip on a floor surface can be determined. When using the James Machine, four readings are made and the average used as the SCF figure. Floor finishes which comply with the Underwriters Laboratories Inc. Requirements for a safe walkway surface have a minimal average SCF figure of 0.5. A reading below 0.50 indicates a presumptive hazardous floor surface.

By way of example, a 0.28% by weight solution of polyethylene glycol (PEG) having an average molecular weight of 20,000 was mopped onto an acrylic based floor finish and allowed to dry. The floor finish before application of the PEG had a SCF of 0.52. The floor with the PEG was then high-speed buffed with a Nobles Ultra-Shine Buffer Model 20 DCH (1300 RPM) equipped with a tan 20" diameter Paratex natural hair pad. Two passes were made with the machine at a slow walking pace over the PEG coated floor finish. The SCF was found after buffing to be 0.45, i.e., an unsafe surface had developed from application of the PEG followed by buffing. Another application was made on a similar floor finish with a solution containing 0.28% by weight PEG having an average molecular weight of 20,000 and 0.075% by weight ammonium quaternary chloride bactericide. The floor was buffed after drying and the average SCF was now found to be 0.55. The addition of the quaternary to the PEG solution had corrected the floor finish surface from an unsafe walkway condition to a safe one.

The composition of this invention can be used on hard surfaces (particularly floors) and can be applied with a mop, sponge, automatic scrubber and other devices commonly used in the industry. The composition will not harm a wide variety of floor surfaces including sealed wood, sealed concrete, asphalt tile, rubber tile, quarry tile, ceramic tile, vinyl tile, vinyl abestos tile and other composition flooring. It can be used on surfaces protected by floor polishes, floor seals, and varnishes as well as on surfaces such as terrazzo and ceramic tiles which have had no protective coating previously applied.

The following example illustrates the invention.

A concentrated solution was made consisting of 4.65% by weight polyethylene glycol having an average molecular weight of 20,000, 3.2% by weight of 50% quaternary ammonium chloride (BTC 2125M), and 92.15% by weight of water. Six ounces by volume of this concentrated solution was then added to 122 ounces by volume of water to obtain an application solution of one gallon. The application solution thus contained: 6 oz/128 oz×1.6 quaternary ammonium chloride=0.075% (750 ppm) and 6 oz/128 oz×4.65 polyethylene glycol=0.28%.

The quaternary ammonium chloride compound was a dual quaternary ammonium chloride made up of equal parts of n-alkyl (60% $C_{12}$, 30% $C_{14}$, 5% $C_{16}$, 5% $C_{18}$) dimethyl benzyl ammonium chloride having the formula:

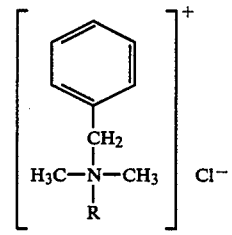

and n-alkyl (68% $C_{12}$, 32% $C_{14}$) dimethyl ethyl benzyl ammonium chloride having the formula:

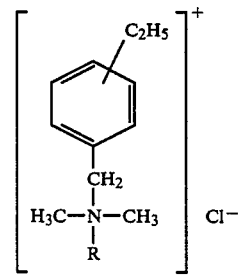

which is available from Onyx Chemical Co. under the tradename "BTC 2125M".

The polyethylene glycol compound used was a polyethylene glycol having the formula:

$$HOCH_2(CH_2OCH_2)_nCH_2OH$$

where n represents the average number of oxyethylene groups, and is available from Dow Chemical Co. under the tradename "PEG Compound 20M Flake".

The composition was applied to an acrylic based floor finish (thickness of finish film about 1 mil) and allowed to evaporate. After about 15 minutes the composition residue was substantially dry and the surface was then subjected to high-speed buffing with a 1300 RPM buffing machine, Nobles Ultra-Shine—Model 20 DCH, equipped with a 20" diameter Paratex natural hair pad. The machine was moved over the floor at a slow walking pace. Each floor section was buffed twice, after which the gloss was determined with a 60-degree specular glossmeter (ASTM D1455-71). The 60° specular gloss reading was 90. The 60° specular gloss of the finish without application of the above composition was 76 (compared to 100, the standard, for polished black glass). Subjectively, the floor after buffing was highly reflective and the surface appeared wet. The static coefficient of friction (ASTM D2047-75) was measured to evaluate the slip resistance of the buffed composition on the floor finish. The SCF was found to be 0.55. Without application of the composition and buffing the ACF was 0.5. Application of the composition and subsequent buffing, therefore, has no adverse effect on the slip resistance of the finish and, infact, improved the slip resistance.

The disinfecting properties of this composition were determined in accordance with the procedures required by the Environmental Protection Agency for making a hard surface disinfecting claim. At 750 ppm (0.075%) active quaternary ammonium chloride, the composition was found to exhibit disinfecting activity against the following organisms:

*Pseudomonas aeruginosa* PFD-10
*Streptococcus faecalis*
*Escherichia coli*
*Salmonella choleraesuis*
*Shigella dysenteriae*
*Staphylococcus aureus*
*Brevibacterium ammoniagenes*
*Streptococcus salivarius*
*Klebsiella pneumoniae*
*Enterobacter aerogenes*
*Salmonella schottmuelleri*

At this level, the composition was also fungicidal against the pathogenic fungi, *Trichophyton mentagrophytes*. It also exhibits effective virucidal activity against influenza A2/Asian (representative of the common flu virus) and *Herpes simplex* Type 2 (causative agent of fever blisters and mononucleosis).

Efficacy tests have also demonstrated that the composition is an effective bactericide and fungicide in the presence of organic soil (5% blood serum).

Although a preferred embodiment of the invention has hereinbefore been described, it will be appreciated that variations of the invention will be perceived by those skilled in the art, which variations are nevertheless within the scope of the invention as defined by the claims appended hereto.

What is claimed is:

1. A process for disinfecting a surface and forming a high-gloss, slip-resistant coating on the surface when dried and high-speed buffed, said process comprising the steps of:
   a. depositing on said surface a layer of a composition comprising a solution, the solute portion of which comprises:
      (i) a solid, waxy polyethylene glycol compound which forms a high-gloss coating when high-speed buffed, said polyethylene glycol compound having the formula:

$$HOCH_2(CH_2OCH_2)_nCH_2OH$$

where n represents the average number of oxyethylene groups and is from about 31 to about 452, and
      (ii) a water-soluble and germicidally-effective quaternary ammonium chloride compound present in an amount sufficient to disinfect the surface and plasticize the polyethylene glycol compound so as to increase the static coefficient of friction (slip resistance) of the coating after high-speed buffing by at least about 5%, and the solvent portion of which consists essentially of water;
   b. permitting the water to evaporate therefrom; and
   c. high-speed buffing said layer to form a high-gloss, slip-resistant coating.

2. The process of claim 1, wherein said quaternary ammonium chloride compound is present in an amount sufficient to increase the static coefficient of friction (slip resistance) by at least about 10%.

3. The process of claim 1, wherein said quaternary ammonium chloride compound is present in amount sufficient to increase the static coefficient of friction (slip resistance) to at least about 0.5.

4. The process of claim 1, wherein n is from about 180 to about 452.

5. The process of claim 4, wherein n is about 180 and said quaternary ammonium chloride compound comprises at least about 0.075% by weight of the solution.

6. The process of claim 1, wherein said quaternary ammonium chloride compound comprises at least about 0.075% by weight of the solution and said polyethylene glycol comprises of from about 0.20 to about 0.40% by weight of the solution.

7. The process of claim 6, wherein n is about 180, said polyethylene glycol compound comprises about 0.28% by weight of the solution and the quaternary ammonium chloride compound comprises about 0.075% by weight of the solution.

8. The process of claim 1, wherein said quaternary ammonium chloride compound is selected from the group consisting of quaternary ammonium chloride compounds having one long alkyl radical containing from 12 to 18 carbon atoms and one benzene nucleus, dialkyl dimethyl ammonium chloride compounds wherein the alkyl groups each contain about 8 to 10 carbon atoms, and mixtures thereof.

9. A composition for disinfecting a surface and forming a high-gloss, slip-resistant coating on the surface when dried and high-speed buffed, said composition comprising a solution, the solute portion of which comprises:
   a. a solid, waxy polyethylene glycol compound having the formula:

$$HOCH_2(CH_2OCH_2)_nCH_2OH$$

where n represents the average number of oxyethylene groups and is from about 180 to about 452; and b. a water-soluble and germicidally-effective quaternary ammonium chloride compound;

and the solvent portion of which consists essentially of water, wherein said solution disinfects the surface and when dried and high-speed buffed forms a hard, high-gloss coating, and wherein said quaternary ammonium chloride compound is present in an amount sufficient to increase the static coefficient of friction (slip resistance) of the coating by at least about 5%.

10. The composition of claim 9, wherein said quaternary ammonium chloride compound increases the static coefficient of friction (slip resistance) by at least about 10%.

11. The composition of claim 9, wherein n is about 180 and said quaternary ammonium chloride compound comprises at least 0.075% by weight of the solution.

12. The composition of claim 9, wherein said quaternary ammonium chloride compound comprises at least about 0.075% by weight of the solution.

13. The composition of claim 9, wherein said quaternary ammonium chloride compound is selected from the group consisting of quaternary ammonium chloride compounds having one long alkyl radical containing from 12 to 18 carbon atoms and one benzene nucleus, dialkyl dimethyl ammonium chloride compounds wherein the alkyl groups each contain about 8 to 10 carbon atoms, and mixtures thereof.

14. The composition of claim 13, wherein said quaternary ammonium chloride compound is selected from the group consisting of alkyl dimethyl benzyl and alkyl dimethyl ethyl benzyl ammonium chloride compounds wherein the alkyl group contains about 12 to 18 carbon atoms, dialkyl dimethyl ammonium chloride compounds wherein the alkyl groups each contain about 8 to 10 carbon atoms, and mixtures thereof.

15. The composition of claim 14, wherein said quaternary ammonium chloride compound is selected from the group consisting of alkyl dimethyl benzyl and alkyl dimethyl ethyl benzyl ammonium chloride compounds wherein the alkyl group contains about 12 to 18 carbon atoms, and mixtures thereof.

16. A composition for disinfecting a surface and forming a high-gloss, slip-resistant coating on the surface when dried and high-speed buffed, said composition comprising a solution, the solute portion of which comprises:

a. a solid, waxy polyethylene glycol compound having the formula:

$$HOCH_2(CH_2OCH_2)_nCH_2OH$$

where n represents the average number of oxyethylene groups and is from about 180 to about 452; and b. a water-soluble and germicidally-effective quaternary ammonium chloride compound;

and the solvent portion of which consists essentially of water, wherein said solution disinfects the surface and when dried and high-speed buffed forms a hard, high-gloss coating, and wherein said quaternary ammonium chloride compound is present in an amount sufficient to increase the static coefficient of friction (slip resistance) of the coating to at least about 0.5.

17. The composition of claim 16, wherein n is about 180 and said quaternary ammonium chloride compound comprises at least 0.075% by weight of the solution.

18. The composition of claim 16, wherein said quaternary ammonium chloride compound comprises at least about 0.075% by weight of the solution.

19. The composition of claim 6, wherein said quaternary ammonium chloride compound is selected from the group consisting of quaternary ammonium chloride compounds having one long alkyl radical containing from 12 to 18 carbon atoms and one benzene nucleus, dialkyl dimethyl ammonium chloride compounds wherein the alkyl groups each contain about 8 to 10 carbon atoms, and mixtures thereof.

20. A composition for disinfecting a surface and forming a high-gloss, slip-resistant coating on the surface when dried and high-speed buffed, said composition comprising a solution, the solute portion of which comprises:

a. of from about 0.20 to about 0.40% by weight of the solution of a solid, waxy polyethylene glycol compound having the formula:

$$HOCH_2(CH_2OCH_2)_nCH_2OH$$

where n represents the average number of oxyethylene groups and is from about 180 to about 452; and b. a water-soluble and germicidally-effective quaternary ammonium chloride compound;

and the solvent portion of which consist essentially of water, wherein said solution disinfects the surface and when dried and high-speed buffed forms a hard, high-gloss coating, and wherein said quaternary ammonium chloride compound is present in an amount sufficient to increase the static coefficient of friction (slip resistance) of the coating by at least about 5%.

21. The composition of claim 20, wherein n is about 180 and said quaternary ammonium chloride compound comprises at least 0.075% by weight of the solution.

22. The composition of claim 20, wherein said quaternary ammonium chloride compound comprises at least about 0.075% by weight of the solution.

23. The composition of claim 22, wherein said polyethylene glycol compound comprises about 0.28% by weight of the solution.

24. The composition of claim 20, wherein said quaternary ammonium chloride compound is selected from the group consisting of quaternary ammonium chloride compounds having one long alkyl radical containing from 12 to 18 carbon atoms and one benzene nucleus, dialkyl dimethyl ammonium chloride compounds wherein the alkyl groups each contain about 8 to 10 carbon atoms, and mixtures thereof.

* * * * *

UNITED STATES PATENT AND TRADEMARK OFFICE
CERTIFICATE OF CORRECTION

PATENT NO. : 4,749,411

DATED : June 7, 1988

INVENTOR(S) : Chapin

It is certified that error appears in the above-identified patent and that said Letters Patent is hereby corrected as shown below:

Col. 3, line 34, after "decyl" insert -- dimethyl --.

Col. 8, line 12, "6" should be -- 16 --.

Signed and Sealed this

Eighteenth Day of October, 1988

Attest:

DONALD J. QUIGG

*Attesting Officer*      *Commissioner of Patents and Trademarks*